March 5, 1968 G. B. LOPER 3,371,740
SYSTEM AND METHOD FOR REDUCING SECONDARY PRESSURE
PULSES IN MARINE SEISMIC SURVEYING
Original Filed March 23, 1964 2 Sheets-Sheet 1
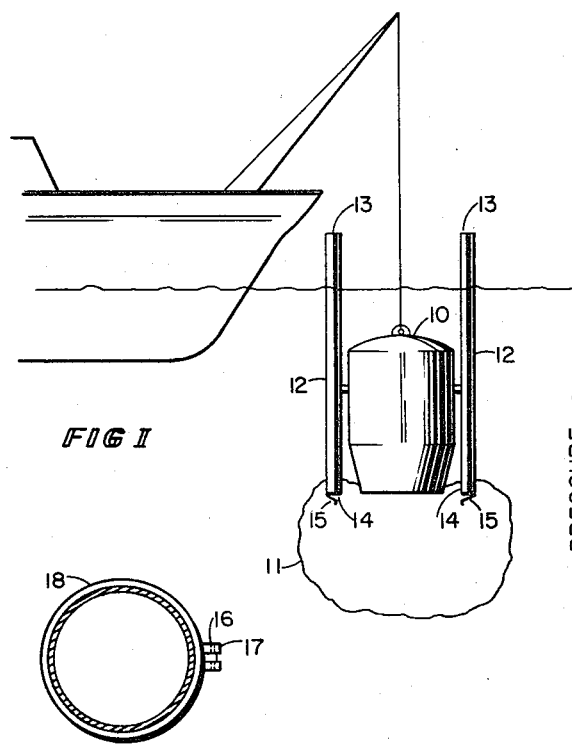
FIG I
FIG III
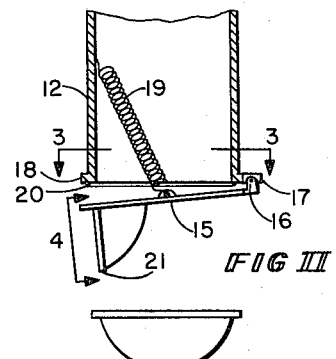
FIG III
FIG IV
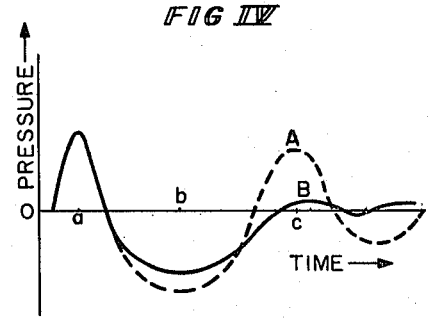
FIG V
INVENTOR
GEORGE B. LOPER
BY *Archer F Zobal*

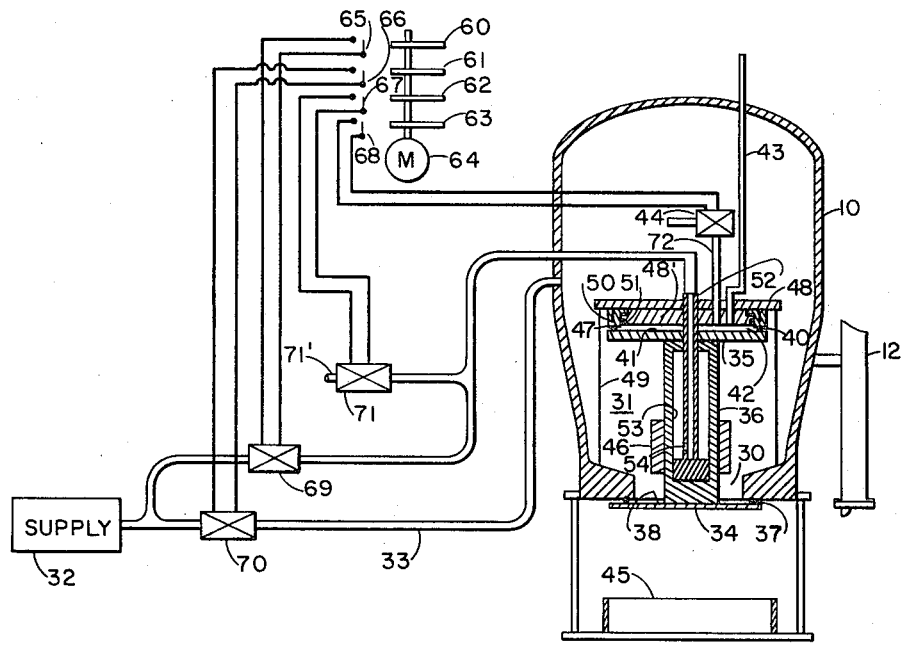
FIG VII
INVENTOR
GEORGE B. LOPER

United States Patent Office 3,371,740
Patented Mar. 5, 1968

3,371,740
SYSTEM AND METHOD FOR REDUCING SECONDARY PRESSURE PULSES IN MARINE SEISMIC SURVEYING
George B. Loper, Dallas, Tex., assignor to Mobil Oil Corporation, a corporation of New York
Continuation of application Ser. No. 353,874, Mar. 23, 1964. This application Aug. 22, 1966, Ser. No. 574,244
14 Claims. (Cl. 181—.5)

ABSTRACT OF THE DISCLOSURE

The specification discloses an arrangement in combination with a marine seismic source for reducing secondary pressure pulses caused by the oscillation of a bubble formed in the production of a seismic disturbance in water. A plurality of conduits is provided, each having an upper end extending to the surface and open to the atmosphere. The other ends of the conduits are located in water below the surface near the source and are positioned to be within the bubble formed upon the generation of the seismic disturbance. Valves are provided for normally closing the lower ends to maintain the conduits substantially free of water. The valves open when encompassed by the bubble to reduce secondary pressure pulses.

---

This is a continuation of application Ser. No. 353,874, filed Mar. 23, 1964, now abandoned.

This invention relates to the generation of acoustic pulses in water and more particularly to the reduction of undesirable secondary pulses occurring subsequent to the generation of an acoustic pulse of interest.

In offshore seismic surveying, acoustic pulses, derived from primary pressure pulses generated in water, are employed to investigate subsurface formations. An acoustic pulse may be obtained, for example, by initiating an explosion in water or by allowing pressurized gas stored in a chamber to be released into the water as will be described hereinafter. These techniques, however, result in the generation of a gas bubble which if uncontrolled will oscillate and generate undersirable secondary pressure pulses subsequent to the initial pressure pulse. More particularly, as the bubble forms, its internal pressure decreases. Eventually, the bubble begins to collapse due to the hydrostatic pressure of the water. The bubble then contracts until normally it is stopped by the highly compressed gas in a bubble now of relatively small radius. At the minimum bubble radius, the gas pressure is large enough to generate a pulse which is known as the secondary pressure pulse. Expansion-contraction cycles continue in decreasing intensity until the bubble energy has been dissipated to the surrounding water.

The secondary pressure pulses are objectionable in that they are reflected from subsurface interfaces in a manner similar to that of the primary pulse and the arrival of the reflected secondary pressure pulse tends to mask or obscure the desired event on the seismic records. Furthermore, the secondary pressure pulses may be directly transmitted to the recording system at the same time as the reflected primary pulse arrives, thereby further confusing the records.

It is an object of the present invention to provide a unique technique and system for reducing undesirable secondary pulses normally produced upon oscillation of a bubble formed in water subsequent to the generation of a primary pressure pulse by a seismic energy source. More particularly, at least one conduit is provided and supported with one end open to the atmosphere and a second end located below the surface of the water near the source. The second end is positioned to be within the bubble formed upon the generation of a primary pressure pulse. Means is provided for normally closing the second end to maintain the conduit substantially free of water. After the primary pressure pulse is generated and the second end is within the resulting bubble formed, the second end is opened to present a flow path between the bubble and the surface for the flow of gas therebetween to reduce secondary pressure pulses.

In a more particular aspect, a valve is employed to open and close the second end of the conduit. The valve normally is maintained in a closed position to maintain the conduit substantially free of water and is moved to an open position when the second end is within the bubble formed.

In a preferred embodiment, the water above the formations of interest is traversed with the seismic source and primary pressure pulses repetitively are produced at spaced positions in the water. The valve is opened upon expansion of each bubble to present a flow path between the surface and the interior of each bubble to reduce secondary pressure pulses.

At certain depths at which seismic disturbances are generated, the internal pressure of the bubble decreases below atmospheric pressure. Under these conditions, bubble oscillation may be reduced, in accordance with the present invention, by opening the second end of the conduit at least when the internal pressure of the bubble decreases below atmospheric pressure to allow air from the surface to pass into the bubble. In the system disclosed for carrying out this technique, the valve is supported such that it will open upon the application of force thereto from the direction of the first end of the conduit. Biasing means is provided for normally applying a force to the valve in a direction to urge the valve to a closed position to maintain the valve substantially free of water. The atmospheric pressure on the valve overcomes the force applied by the biasing means to actuate the valve to open the second end when the internal pressure within the bubble decreases to a predetermined value below atmospheric pressure.

For further objects and advantages of the invention and for a more complete understanding thereof, reference may now be had to the following description taken in conjunction with the accompanying drawings wherein:

FIGURE 1 schematically illustrates the system of the present invention;

FIGURE 2 is an enlarged partial cross section of a portion of the system of FIGURE 1;

FIGURE 3 is a cross-sectional view of the system of FIGURE 2 taken along the lines 3—3 thereof;

FIGURE 4 is a view of the system of FIGURE 2 taken along the lines 4—4 thereof;

FIGURE 5 illustrates traces useful in understanding the invention; and

FIGURE 6 illustrates a seismic source with which the system of the present invention may be employed.

Referring now to FIGURE 1, there is illustrated a seismic source 10 supported from a boat and employed for generating a primary pressure pulse in the water. One type of source for generating pressure pulses useful for seismic exploration will be described hereinafter. The generation of each primary pressure pulse results in the formation of an expanding gas bubble illustrated at 11. In accordance with the present invention, there are provided a plurality of conduits 12 for reducing undesirable secondary pressure pulses which normally would be produced by the bubble upon oscillation. More particularly, each conduit has a first end 13 open to the atmosphere and a lower end 14 so positioned that it will break into the bubble as the bubble expands. Valves 15 are provided to normally maintain the lower ends of the conduits closed to maintain the conduits free from water. When the bubble formed encompasses the lower ends 14, valves 15 are opened to present a plurality of flow paths between the surface and the bubble for the flow of gas to prevent the formation of high pressures in the bubble subsequent to expansion.

Preferably, the lower ends of conduits 12 are closed when the source 10 is lowered into the water to begin operations, whereby the conduits 12 initially are free of water.

As mentioned previously, at certain depths at which seismic disturbances are generated, the internal pressure of the bubble decreases below atmospheric pressure. Under these conditions secondary pressure pulses may be reduced by opening the valves 15 at least when the internal pressure of the bubble decreases below atmospheric pressure to allow atmospheric air to pass into the bubble. More particularly, the introduction of atmospheric air into the bubble prevents the bubble pressure from decreasing much below atmospheric pressure and thus reduces the pressure differential between minimum bubble pressure attained and hydrostatic pressure which the bubble ultimately seeks. Subsequent to the generation of the initial pressure pulse, bubble oscillation and hence secondary pressure pulses therefore are reduced in amplitude relative to that which would occur if air were not introduced into the bubble. The present invention is particularly advantageous since it makes readily available a large supply of air for introduction into the bubble. The bubble thus is prevented from contracting to a small radius where high pressures are generated and the subsequent pressure pulses which are generated are of low frequency and amplitude insignificant to seismic records. As will become apparent hereinafter, the present invention is particularly applicable with seismic systems employed for generating seismic disturbances repetitively at short time intervals, for example, every six seconds as a boat traverses the water.

Referring to FIGURE 2, there is disclosed one type of arrangement for opening the valves 15 as the internal pressure of the bubble decreases below atmospheric pressure. More particularly, as illustrated in FIGURES 2 and 4, valve 15 is pivotally coupled at 16 to support members 17 extending from flange 18. A spring 19 is provided for normally biasing the valve 15 to a closed position. A rubber ring and seat 20 supported on flange 18 is provided to engage the upper surface of valve 15 to form a seal between the valve 15 and the conduit 12 to prevent water from entering the conduit when the valve is in its closed position. As the lower end of the conduit 12 breaks into the bubble and as the internal pressure of the bubble decreases below atmospheric pressure, the pressure on the top surface of valve 15 overcomes the upward force provided by spring 19, thereby pushing the valve 15 downward to an open position to allow the atmospheric air to pass into the bubble.

In accordance with another aspect of the present invention, a vane 21, illustrated in FIGURES 2 and 4, may also be attached to each valve to aid in opening the valve. More particularly, the vane has a large surface area facing the outward flow of the water from the center of the bubble. The water moving in a direction outwardly from the center of the bubble thus imparts a force to the vane in a direction to oppose the upward force applied by the spring 19. This force is sufficient to move the valve 15 to an open position. Little or no water enters the conduit 12, however, since the bubble expands rapidly to encompass the lower end 14. In addition, the internal pressure of the bubble rapidly decreases below atmospheric pressure and the pressure differential across the valve becomes sufficient to move the valve downward before it is pulled to a closed position by spring 19.

Although the vane 21 is illustrated as attached to the end of the valve opposite the pivot end, the vane may be attached satisfactorily near the pivot end to aid in opening the valve.

Referring to FIGURE 5, there is illustrated the manner in which the system of the present invention reduces secondary pressure pulses in operations where the internal pressure of the bubble decreases below atmospheric pressure and air from the surface is introduced into the bubble. More particularly, the primary pressure pulse, from which the acoustic pulse is derived, is illustrated at time $a$ at which time the pressure in the water is at a maximum. Upon normal expansion of the resulting bubble, the pressure therein decreases to a minimum value, illustrated at time $b$ of curve A. At this point, the internal pressure of the bubble is below the hydrostatic pressure of the water. More particularly, as the bubble expands, the internal pressure of the bubble decreases until eventually it equals the hydrostatic pressure at the point of bubble formation. The bubble, however, continues to expand beyond this point due to the inertial flow of water. During this phase of bubble expansion, the internal pressure of the bubble drops below the hydrostatic pressure and, at certain depths, below atmospheric pressure. Eventually, the hydrostatic pressure stops the outward water flow. If the bubble were allowed normally to contract to a small radius, the pressure in the bubble would increase to produce a large secondary pressure pulse as illustrated at time $c$ of curve A. By introducing air into the bubble in accordance with the present invention, however, the minimum bubble pressure is maintained at a higher level as illustrated at time $b$ of curve B, and the secondary pressure pulse, illustrated at time $c$ of curve B, is substantially reduced.

Referring now to FIGURE 6, there will be described one system for generating acoustic pulses in the water with which the system of the present invention may be employed. This system as well as other embodiments thereof are described and claimed in my copending application Ser. No. 534,130, filed Mar. 14, 1966, entitled Seismic Source, and assigned to the same assignee as the present invention and which is a continuation in part of application Ser. No. 354,083, filed Mar. 23, 1964, now abandoned. More particularly, the system comprises a chamber 10 having an outlet end 30 to be coupled to water. A quick-opening spool-shaped valve 31 is provided for opening and closing the outlet end. Fluid is injected into the chamber from a supply 32 and conduit 33 to create a fluid pressure within the chamber substantially greater than the hydrostatic pressure of the water at the outlet end. In the system to be described, the fluid injected is a gas such as air, although a combustible fluid such as diesel fuel may be employed in the chamber and ignited to create a high gas pressure therein as described in the above-mentioned copending application. When the pressure within the chamber is at a maximum value, the valve 31 is actuated to allow the pressurized air to escape into the water to generate an acoustic pulse in the water. More particularly, the valve 31 is a quick-opening valve which allows the pressurized air in the chamber to escape into the water in a minimum of time to create a pressure pulse therein and having a maximum value at time $a$ illustrated in FIGURE 5. The release of the air results in the formation of a bubble which expands and at which time the system of the present invention is employed to reduce undesirable secondary pressure pulses as described above.

In the system illustrated in FIGURE 6, the pressurized air within the chamber is employed to maintain the valve 31 in a closed position and to actuate the valve 31 to open the outlet end to release the pressurized air into the water. More particularly, the spool-shaped valve comprises a lower rim 34 coupled to an upper rim 35 by connecting member 36. The valve 31 is moved to a closed position (by means to be described hereinafter) wherein rubber O-ring and seat 37 engages the inner surface 38 of rim 34 to seal the outlet end. The inner diameter of O-ring 37 is slightly smaller than the diameter of rim 35. When the valve 31 is closed, rubber O-ring 40 engages the upper surface 41 of rim 35 to form a second chamber 42 sealed from chamber 10 and which is vented to the atmosphere by way of a small conduit 43. Thus, when the chamber 10 is pressurized, a net upward force is applied to the valve to maintain the valve in a closed position.

When it is desired to generate an acoustic pulse, solenoid valve 44 is actuated to allow the pressurized air within the chamber 10 to pass into the chamber 42. Thus, additional force is applied to the upper surface 41 of rim 35 to overcome the upward force and break the seal between the valve and the chamber. The pressurized air in chamber 10 then acts to force the valve 31 downward in a minimum of time and thus is rapidly released into the water to generate an acoustic pulse. Container 45 is employed to impede the downward travel of the valve 31. More particularly, as the rim 34 of valve 31 approaches and enters the container 45, the water therein acts to brake the movement of the valve.

The valve 31 is supported for reciprocation in the chamber 10 by means including bearing member 46. The system for supporting the top O-ring 40 comprises a ring-shaped member 47 slidably supported by disk-shaped members 48 and 48' which in turn are coupled to the chamber 10 by rods 49. A plurality of springs 50 are provided in the ring-shaped member 47 to urge the member 47 downward and hence the O-ring 40 in contact with the surface 41 of rim 35. This arrangement is provided to insure that O-ring 40 contacts surface 41 at the same time that O-ring 37 contacts surface 38, even though there might be a slight change in dimensions in the O-rings through usage. O-ring 51 is provided between members 47 and 48 to maintain a seal therebetween.

The system for moving the valve 31 to a closed position comprises a conduit 52 fixedly secured to member 48 and extending downwardly into a chamber 53 formed in connecting member 36. Thus, the valve 31 slides relative to conduit 52. When the valve is in a downward position, the valve is moved upwardly by injecting air into conduit 52 and into chamber 53 by way of aperture 54. The air injected applies a force to the upper surface of chamber 53 to move the valve 31 upward. Suitable seals (not shown) are provided for preventing the air injected into chamber 53 from escaping.

The system preferably is cyclically operated whereby acoustic pulses are generated repetitively at short time intervals, for example, every six seconds. A plurality of cams 60–63 driven by motor 64 sequentially actuate switches 65–68 within each cycle to control the various components of the system to generate an acoustic pulse. The sequence of operation within a cycle will be described now, assuming that an acoustic pulse has just been generated and that the valve 31 is in an open position. At this time, spring-biased solenoid valve 44 within chamber 10 is closed as well as spring-biased solenoid valves 69–71 employed for controlling the flow of air into and out of chamber 10. As mentioned previously, the release of the pressured air into the water results in the formation of a large gas bubble which completely encompasses the outlet end 30. While the bubble still encompasses the outlet end 30 and prior to the time the bubble drifts away, the valve 31 is moved to a closed position to prevent water from entering chamber 10. More particularly, cam 60 closes switch 65 to open the valve 69 to allow pressurized air from supply 32 to pass into chamber 53 to move the valve 31 to a closed position. Cam 61 next closes switch 66 to open valve 70 to allow pressurized air from source 32 to flow into the chamber 10. When the pressure within the chamber 10 becomes sufficient to maintain valve 31 in a closed position, cam 60 allows switch 65 to open, thereby stopping the flow of air into chamber 53. Simultaneously, or at a short time thereafter, cam 62 closes switch 67 to open solenoid valve 71 to release the pressure in the chamber 53 to the atmosphere by way of conduit 71'. At a short time interval thereafter, cams 61 and 62 allow switches 66 and 67 to open, thereby closing valves 70 and 71. Finally, cam 63 closes switch 68 to open valve 44 to allow pressurized gas to flow from chamber 10 by way of conduit 72 into chamber 42 to actuate the valve for the generation of an acoustic pulse. More particularly, the inner diameter of conduit 43 is smaller than that of conduit 72 and the opening of valve 44. Thus, the pressure in chamber 42 builds up to a value sufficient to overcome the net upward force on valve 31, thereby breaking the seal between the chamber and the valve. The pressurized air in chamber 10 then forces the valve 31 downward in a minimum of time and is rapidly released into the water to generate an acoustic pulse.

Acoustic pulses may be generated with the system of FIGURE 6 by pressurizing the chamber 10, having a volume of about 1.3 cubic feet, with air to a pressure of the order of 300 pounds per square inch over atmospheric pressure. In this system, six conduits 12 symmetrically spaced around the outlet end 30 were employed to reduce secondary pressure pulses. Each conduit had an internal diameter of four inches. The lower end 14 of each conduit was located at a level substantially equal to that of the outlet end 30 of chamber 10 and spaced of the order of 15 inches from the outlet end.

Having described the invention, it will be understood now that certain modifications will suggest themselves to those skilled in the art and it is intended to cover such modifications as fall within the scope of the appended claims.

What is claimed is:

1. In a system for producing acoustic pulses useful in the investigation of underwater geologic formations wherein a seismic source located in water is employed to produce in water below the surface a primary pressure pulse which results in the formation of an expanding gas bubble, the combination therewith of:

at least one conduit maintained substantially free of water and formed of structure having a first end open to the surface to the atmosphere and a second end located in water below the surface near said source and positioned to be within the resulting bubble formed upon the generation of a primary pressure pulse in water, and means for normally closing said second end to maintain said conduit substantially free of water and for opening said second end when said second end is within said bubble to present a flow path between said bubble and the surface for the flow of gas therebetween to reduce the magnitude of secondary pressure pulses formed subsequent to the formation of said primary pressure pulse.

2. The combination of claim 1 wherein:

said second end is located in water below the surface near said source and spaced therefrom at a position to be within the resulting bubble formed upon the generation of a primary pressure pulse in water.

3. The system of claim 1 wherein:

said last-named means opens said second end only when said second end is within said bubble.

4. In a system for producing acoustic pulses useful in the investigation of underwater geologic formations wherein a seismic source located in water is employed to produce in water below the surface a primary pressure pulse which results in the formation of an expanding gas bubble, the combination therewith of:

a plurality of conduits maintained substantially free of water and formed of structure each having a first end open to the surface and a second end located in water below the surface near said source and spaced therefrom at a position to break into an expanding bubble formed upon the generation of a primary pressure pulse in water, and means coupled to each of said second ends for normally closing said second ends when unencompassed by said bubble to maintain said conduits substantially free of water and for opening said second ends when said second ends are within said bubble to present a plurality of flow paths between said bubble and the surface for the flow of gas therebetween to prevent the formation of undesirable high pressures in said bubble subsequent to initial expansion.

5. A system for producing acoustic pulses useful in the investigation of underwater geologic formations comprising:
- a source located below the surface of water for repetitively producing in water at spaced-apart time intervals primary pressure pulses each of which results in the formation of an expanding gas bubble,
- means for traversing the water with said source for producing primary pressure pulses in water at spaced positions in the water,
- at least one conduit formed of structure having a first end open to the surface to the atmosphere and a second end located in water below the surface near said source and spaced therefrom at a position to break into each bubble formed as said bubbles expand, and
- means coupled to said second end for normally closing said second end to maintain said conduit substantially free of water for continuously maintaining, during and between the production of said primary pressure pulses, a substantially water-free path open to the surface to the atmosphere and extending below the surface of water adjacent said source,
- said last-named means being actuated to open said second end when said second end is within said bubbles formed to present a flow path between said bubbles and the surface for the flow of gas therebetween to reduce the magnitude of secondary pressure pulses formed subsequent to the formation of said primary pressure pulses.

6. In a system for producing acoustic pulses useful in the investigation of underwater geologic formations wherein a seismic source located in water is employed to produce in water below the surface primary pressure pulses at spaced-apart time intervals, each of which results in the formation of an expanding gas bubble, the combination therewith of:
- second means for reducing secondary pressure pulses,
- said second means including a plurality of spaced-apart conduits formed of structure each having a first end open to the surface to the atmosphere and a second end located in water below the surface near said source and positioned to break into the expanding gas bubbles formed upon the generation of said primary pressure pulses in water, and
- means for normally closing said second ends when said second ends are unencompassed by said bubbles to maintain said conduits substantially free of water for continuously maintaining a plurality of substantially water-free paths open to the surface to the atmosphere and extending below the surface of water adjacent said source,
- said last-named means opening said second ends when said second ends are within said bubbles to present a plurality of flow paths between said bubbles and the surface for the flow of gas therebetween to prevent the formation of undesirable high pressures in said bubbles subsequent to initial expansion.

7. In a system for producing acoustic pulses useful in the investigation of underwater geologic formations wherein a seismic source located in water below the surface is employed to produce at spaced-apart time intervals in water primary pressure pulses, each of which results in the formation of an expanding gas bubble having a decreasing internal pressure and which decreases below atmospheric pressure, the combination therewith of:
- means for reducing contraction of said bubbles,
- said last-named means including at least one conduit formed of structure having a first end extending above the surface and open to the surface to the atmosphere and a second end located in water below the surface near said source and spaced therefrom at a position to be within said resulting bubbles formed upon the generation of said primary pressure pulses in water,
- valve means coupled to said second end for opening and closing said second end, and
- control means for normally maintaining said valve means in a closed position to maintain said conduit substantially free of water for continuously maintaining, during and between the production of said primary pressure pulses, a water-free path open to the surface to the atmosphere and extending below the surface of water adjacent said source,
- said valve means being actuated at least when the internal pressure of the bubbles decreases to a predetermined value below atmospheric pressure to allow atmospheric air from the surface to pass into said bubbles to reduce subsequent contraction thereof.

8. The combination of claim 7 wherein said control means comprises:
- support means for allowing said valve means to open upon the application of force to said valve means from the direction of said first end of said conduit, and
- biasing means for normally applying a force to said valve means in a direction to urge said valve means to a closed position to maintain said conduit substantially free of water,
- said biasing means allowing the atmospheric pressure on said valve means to overcome said force applied by said biasing means to actuate said valve means to open said second end when the internal pressure within said bubble decreases to a predetermined value below atmospheric pressure.

9. The combination of claim 8 comprising:
- a vane attached to said valve means and positioned to be exposed to the water to aid in actuating said valve means to open said second end,
- said vane having a surface area facing the outward flow of water from the center of said bubble formed whereby the wave front formed by the outward flow of water will impart a force to said vane in a direction to oppose said force applied by said biasing means to aid in actuating said valve means to open said second end.

10. The combination of claim 9 wherein said biasing means comprises a spring.

11. The combination of claim 10 wherein a plurality of conduits similar to said one conduit are employed for allowing atmospheric air from the surface to pass into said bubble, the second end of each conduit being located adjacent said source.

12. The combination of claim 1 wherein said source comprises:
- a chamber formed of structure for confining high pressure gases therein,
- said chamber having an outlet port to be coupled to water,
- valve means for opening and closing said outlet port,
- means for introducing a fluid into said chamber when said valve means is in a closed position to form a high gas pressure confined in said chamber,
- means for controlling said valve means suddenly to move said valve means to open said outlet port to allow the pressurized gas in said chamber to be released rapidly into the water to generate said primary pressure pulse,
- said second end of said conduit being positioned adjacent said outlet port.

13. The combination of claim 7 wherein:
- said valve means is pivotally coupled to said second end of said conduit, said conduit being separate from said source.

14. In a marine seismic surveying system including a seismic source for producing repetitivity in water below the surface primary pressure pulses which result in the formation of a gas bubble; at least one conduit having an opened end and second end positioned to be within the bubbles formed; and tow means for towing said source below the surface of water with said open end of said conduit above the surface of water and open to the atmosphere, the method of operating said system comprising the steps of:

with said source generating primary pressure pulses in water spaced in time, during the time periods between the generation of said primary pressure pulses when said second end is in contact with water maintaining said second end closed to maintain a water-free path from said second end of said conduit to the surface, and after said primary pressure pulses are generated and said second end of said conduit is within the bubbles formed, opening said second end of said second end of said conduit to present a water-free flow path between said bubbles and the surface for the flow of gas therebetween to reduce the magnitude of secondary pressure pulses formed.

References Cited

UNITED STATES PATENTS

| | | | |
|---|---|---|---|
| 2,564,128 | 8/1951 | Pugh | 181—.5 |
| 2,599,245 | 6/1952 | Finn | 181—.5 |
| 2,877,790 | 3/1959 | Wilhelm et al. | 137—320 |
| 3,055,450 | 9/1962 | Richards | 181—.5 |
| 3,292,140 | 12/1966 | Angona et al. | 340—7 |

BENJAMIN A. BORCHELT, *Primary Examiner.*

SAMUEL FEINBERG, *Examiner.*

P. A. SHANLEY, W. KUJAWA, *Assistant Examiners.*